(No Model.)
D. W. AYLWORTH.
DEVICE FOR TRANSPLANTING TREES.
No. 498,608. Patented May 30, 1893.
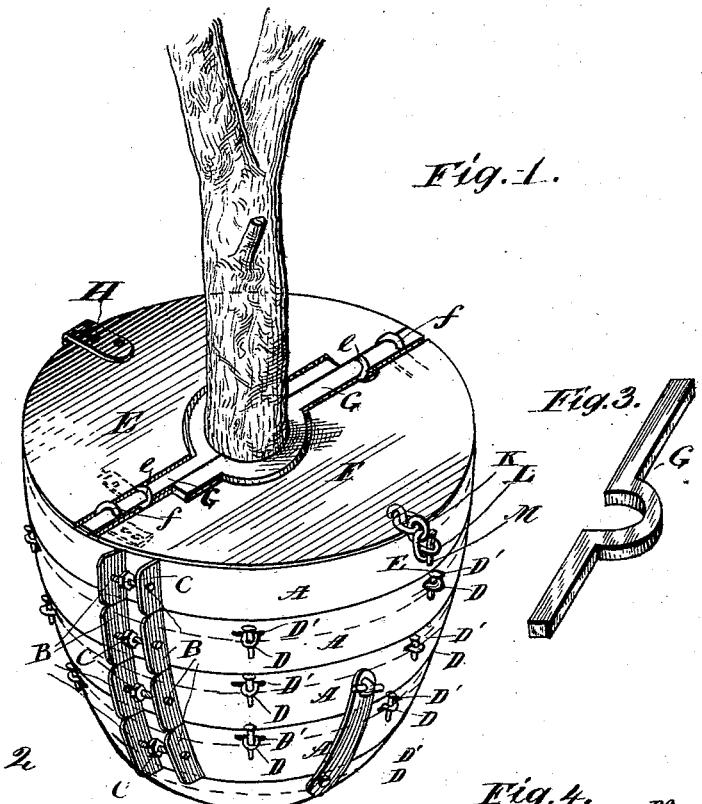
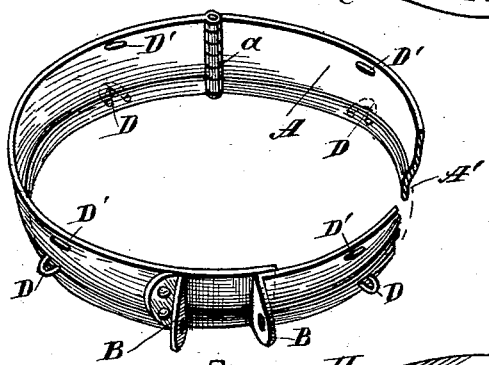
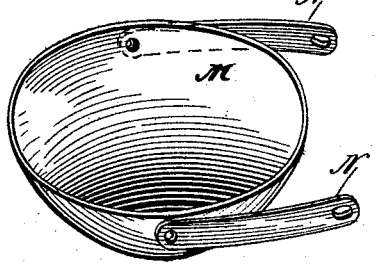
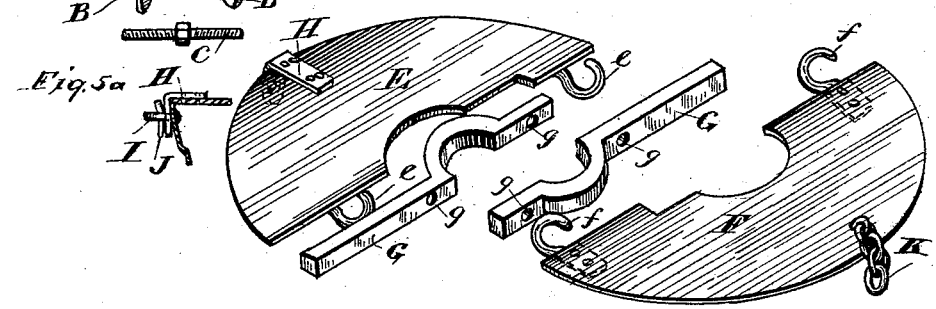
Witnesses
Inventor
Daniel W. Aylworth
by Wm. M. Monroe
Attorney

UNITED STATES PATENT OFFICE.

DANIEL W. AYLWORTH, OF CLEVELAND, OHIO.

DEVICE FOR TRANSPLANTING TREES.

SPECIFICATION forming part of Letters Patent No. 498,608, dated May 30, 1893.

Application filed September 3, 1892. Serial No. 445,013. (No model.)

*To all whom it may concern:*

Be it known that I, DANIEL W. AYLWORTH, a citizen of the United States, and a resident of Cleveland, county of Cuyahoga, State of Ohio, have invented certain new and useful Improvements in Devices for Transplanting Trees, of which I hereby declare the following to be a full, clear, and exact description, such as will enable others skilled in the art to which it appertains to make and use the same.

My invention relates to improvements in devices for transplanting trees, and its objects are to provide means for securely inclosing the roots and adjacent soil while removing the tree from the earth and transplanting it to some other position. The device is equally well adapted to loose or sandy soils and heavy clayey soils, and consists in the combination and arrangement of parts and details of construction as hereinafter described, shown in the accompanying drawings, and more specifically pointed out in the claims.

In the drawings, Figure 1 is a perspective view of the invention. Fig. 2 is a detail of one of the hoops. Fig. 3 is a detail of yoke. Fig. 4 is a detail of bottom plate; and Fig. 5 is a detail of covers and attachments. Fig. 5ª is a section of fastening.

In the figures A A are hoops placed horizontally about the ball of earth encircling the roots, each one slightly over-lapping the next above adjacent hoop from top to bottom, a recess A' being formed on the edge of each hoop for this purpose. The extremities of each hoop are designed to pass each other as shown in detail, and extensions on brackets B are provided with bolts C having oppositely turned threads and central heads, whereby the extremities may be powerfully brought together. Any convenient form of bolt or turn buckle however may be used. Any suitable means may be employed for securing the hoops together; as shown, lugs D project from the hoops and pass through registering openings D' in the adjacent hoops; through these lugs staples E pass and may be tightly driven into place. Small chains or cords may attach the staples to the hoops to prevent their loss. To further secure the sectional case thus formed to the ball which it encircles, covers E and F are placed over it on either side of the tree trunk, semi-circular openings being left for this purpose. These covers are provided with hooks *e* and *f* on their adjacent edges which are adapted to seize upon the bar or yoke G which extends across the ball at the base of the tree. Any convenient form of couplings may attach the covers to the upper hoop so that they can be conveniently detached whenever desired, as shown. A bent lug H, link I and staple J are shown on one side, and a chain K, link L and staple M on the other side. If desired, the bar G may be divided in two portions each partially encircling the tree trunk, and bolted together at *g* so as to be readily detached. The hoops may be hinged at the back at *a*, or they may be made of steel bands which will readily bend to the diameter of the ball of earth and roots, having been first stamped or rolled to the desired taper. It will be readily seen that a substantial and impervious casing is thus formed to the ball of earth, and while extremely portable the casing can easily be removed, and being adjustable one size of casing is adapted to a large variety of sizes of trees. It will also be seen that in use while unearthing a tree and applying the sectional casing, one section at a time can be laid in place as the work progresses, and each section can be attached without removing any great amount of soil, for this reason it is especially adapted to sandy soils where the liability is great of loosening the earth about the roots, and of its falling away from them before it can be secured by any portion of the casing. Furthermore any projecting roots can be bent back into the ball before hooping it down, and finally the terminal plate M can be pushed into place and all the parts secured together before the tree is lifted out of the cavity.

In constructing the device the upper hoops may be straight especially for deep roots and only the lower sections tapering. Since however the added taper makes them more inflexible it will be necessary to hinge the lower hoops. The bottom plate may be dispensed with entirely in some instances as when a deep tap root is encountered.

In constructing the bottom plate it is preferable to attach it to the upper sections by longer bands as N which can be turned downward when the plate is pushed underneath the ball, and used as handles to push it into place, in the position shown in Fig. 4. Afterward they are secured as in Fig. 1. by lug and staple.

Having described my invention, what I claim as new, and desire to secure by Letters Patent, is—

1. In a device for transplanting trees, horizontally arranged detachable hoop sections, substantially as described.

2. In a device for transplanting trees horizontally arranged hoop sections over-lapping and detachably secured to one another, substantially as described.

3. In a device for transplanting trees, the combination of horizontally arranged hoop sections, detachably secured to one another, and two horizontal covers encircling the tree trunk detachably secured to the upper hoop, substantially as described.

4. In a device for transplanting trees, the combination of horizontally arranged hoop sections, horizontal cover sections and a transverse bar or yoke between the cover sections with means for detachably securing the various sections about the ball of earth and roots, substantially as described.

5. In a device for transplanting trees, the combination of horizontal vertical and tapering sections, terminal plate, sectional covers and transverse bar, substantially as described.

DANIEL W. AYLWORTH.

Witnesses:
WM. M. MONROE,
JOS. J. DAVID.